UNITED STATES PATENT OFFICE.

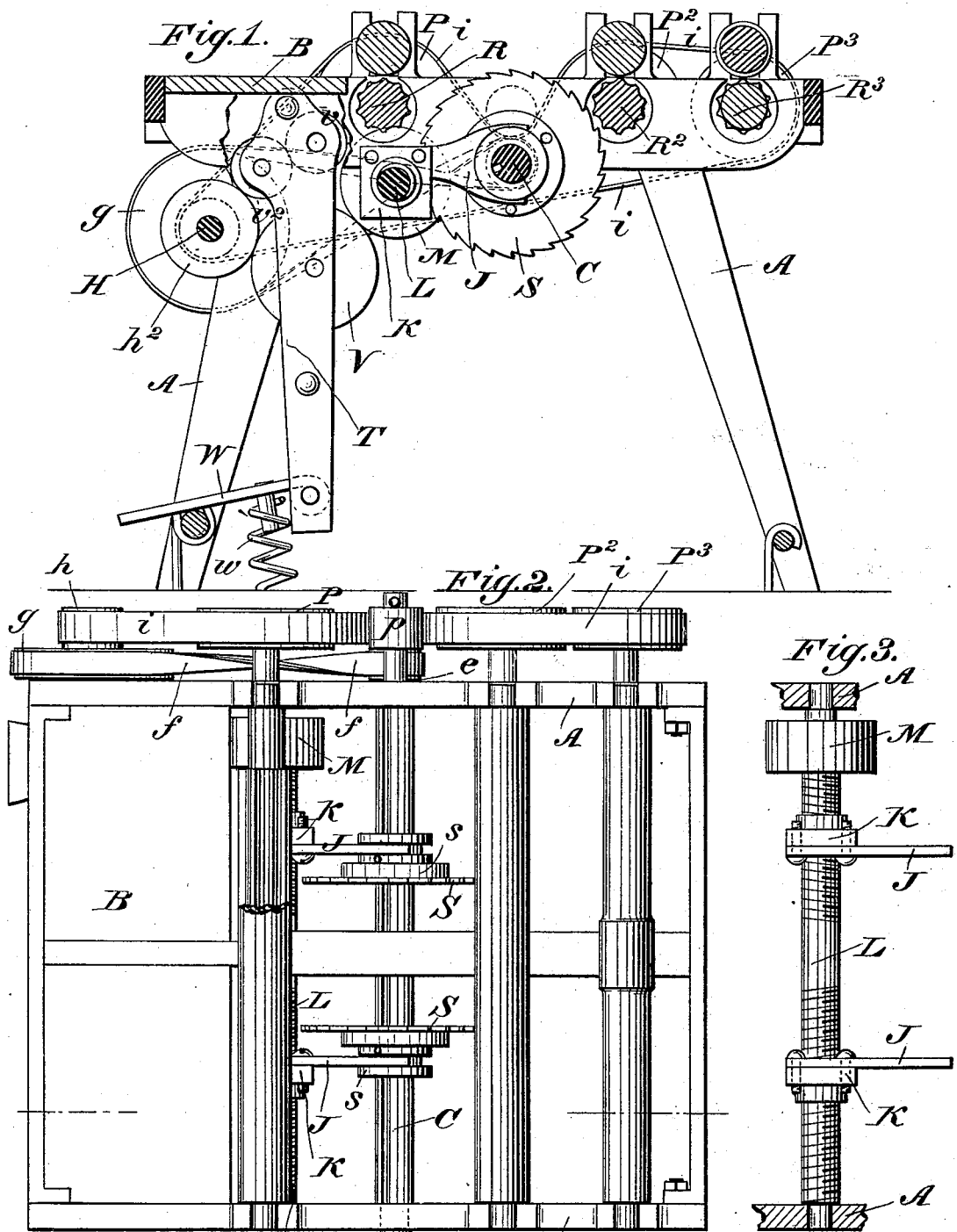

FRANCIS J. DRAKE, OF BELLEVILLE, ONTARIO, CANADA.

SHINGLE-EDGING MACHINE.

SPECIFICATION forming part of Letters Patent No. 240,310, dated April 19, 1881.

Application filed July 10, 1880. (Model.)

*To all whom it may concern:*

Be it known that I, FRANCIS JAMES DRAKE, of Belleville, in the Province of Ontario and Dominion of Canada, have invented a new and useful Improvement in Shingle-Edging Machines, of which the following is a specification.

My invention relates to a machine for trimming and finishing the edges of shingles.

The invention consists in a novel arrangement of feed-rollers and their driving-pulleys, and of the edging-saws and devices connected therewith, whereby provision is made for feeding the shingles to and from the saws and for adjusting the saws for edging shingles of different widths, as hereinafter described.

In the accompanying drawings, Figure 1 is a vertical section of a machine embodying my improvements. Fig. 2 is a top view of the same. Fig. 3 is a detail view.

Similar letters of reference indicate corresponding parts.

The working parts of the machine are carried by a frame, A, of any suitable construction, provided with a feed-board, B, at the front end thereof.

The feed-rollers are similar to those employed in lumber-planing machines, being arranged in pairs, with the lower roller fluted longitudinally and the upper roller smooth.

The saw-arbor C is journaled in the frame A, between the first and second pairs of feed-rollers. At one end it is provided with a band-wheel, $d$, around which passes a belt from the driving-power. At the other end is a pulley, $e$, from which a belt, $f$, passes to a band-wheel, $g$, on a shaft, H, journaled in the front portion of the frame. The shaft H also carries a pulley, $h$, from which a belt, $i$, passes to the three band-wheels $P\ P^2\ P^3$ of the feed-rollers $R\ R^2\ R^3$, being held in contact with all three by an idler-pulley, $p$. The band-wheels $P\ P^2\ P^3$ are of different diameters, so as to cause the three pairs of feed-rollers to run at different rates of speed. The first pair of rollers feed the work to the saws at the rate of three-fourths of an inch to each revolution of the saws. After passing the saws the work is engaged by the second pair of rollers and its motion is accelerated. Upon reaching the third pair of rollers the motion is still further accelerated, and the work is ejected from the machine to a point beyond where the trimmings and refuse are deposited.

The saws S S are attached to the saw-arbor C by feather-and-groove attachment, so as to turn with said arbor, and yet be allowed to slide longitudinally of the same. To each saw is attached a collar, $s$, having a peripherical groove therein, with which engages a fork on one end of a bar, J, the other end of which is attached to a nut, K, through which passes a screw-shaft, L, having its ends journaled in the frame A. This shaft L has a right-hand thread running from its mid-length toward one end, and a left-hand thread running from the same point toward the other end; and the two nuts K work, respectively, on these threads, so as to move toward or from each other, according to the direction of rotation of the shaft L, and thus cause the saws to slide on the arbor in the same directions with them, in order to accommodate shingles of different widths.

Near one end of the screw-shaft L is a friction-wheel, M, with which is arranged to engage a series of friction-wheels, V $v\ v^2$, which also engage with a friction-wheel, $h^2$, carried by the shaft H. The wheels V $v\ v^2$ are carried by a frame, T, at the lower end of which is a treadle, W, pivoted between the legs of the frame A. Under the front end of the treadle is a spring, $w$, which has a tendency to counterbalance the weight of the frame T. When the operator presses with the heel upon the rear end of the treadle the frame T is raised, so as to hold the wheel V in contact with the wheel $h^2$ and receive motion from it, which motion is transferred by wheel V to wheel M, and thus to the screw-shaft L, causing it to turn in such a direction as to move the saws farther away from each other. When the front end of the treadle is depressed by the toe of the foot the frame T is lowered, so as to hold the wheels $v$ and $v^2$ in contact with each other and with wheels $h^2$ and M, transferring motion from the former to the latter and to the screw-shaft in an opposite direction to that imparted by the wheel V, so as to cause the saws to slide toward each other on the arbor, in order to trim and edge shingles of less width. By this means the operator can readily and quickly adjust the saws to any desired distance apart, in order to accommodate them to shingles of different widths.

It is immaterial whether the first and second pairs of rolls revolve at the same velocity or not, but the third pair must have greater speed, so as to prevent the edgings from mixing with the shingles. The shingle is fed butt-end foremost to the saws by the first pair of rolls, and after passing the saws, but before the top end leaves the first pair of rolls, it is caught by the second pair of rolls, which feed it to the third pair. The saw having then ceased to cut, and the third pair of rolls having increased velocity, the shingle is thrown away from the machine. The last rolls, being of less diameter at the sides than in the middle, do not engage the edgings or refuse, which is consequently dropped at the end of the machine.

I am aware that it is not new to use two or more saws adapted to be adjusted to or from each other on their arbor; but

What I claim as new and of my invention is—

1. In a shingle-machine, the combination, substantially as shown and described, of two edging-saws, and feeding-rolls of which the last pair is of less diameter at the sides than at the middle, to allow the edgings or refuse to drop out at the ends of the machine, as set forth.

2. The combination, with the saws S and their grooved collars $s$, of the bars J, nuts K, and right and left threaded screw-shaft L, arranged and operating as shown and described, for the purpose specified.

3. The combination, with the screw-shaft L, provided with the friction-wheel M, of the friction-wheels $h^2$, V, $v$, and $v^2$, and the frame T, and treadle W, substantially as and for the purpose herein shown and described.

FRANCIS JAMES DRAKE.

Witnesses:
GEO. DEMAREST,
*Of Belleville, Ontario, Canada, Notary Public.*
S. BRASSON,
*Of Belleville, Ontario, Canada, Student.*